J. W. HARRELL.
DIPPER TOOTH.
APPLICATION FILED MAR. 1, 1913. RENEWED JUNE 18, 1914.
1,126,759.   Patented Feb. 2, 1915.
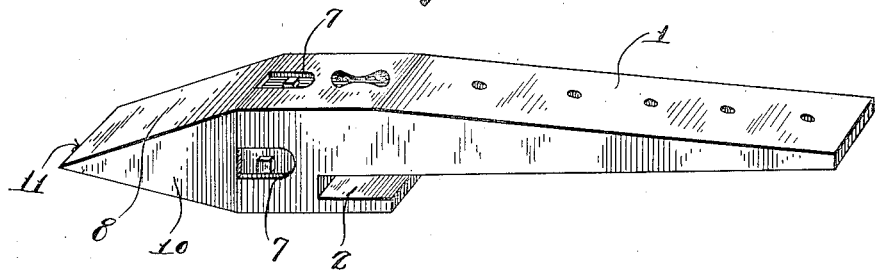
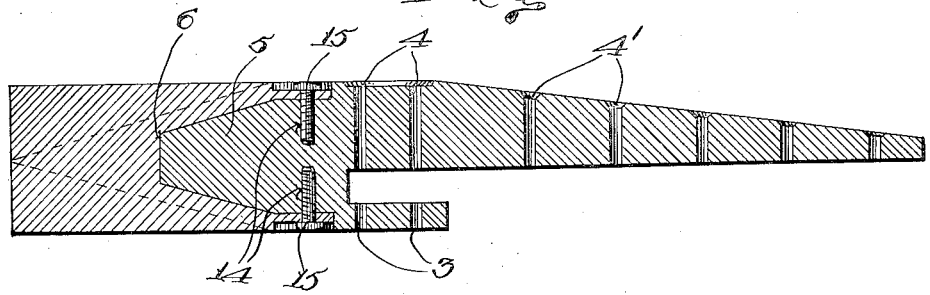
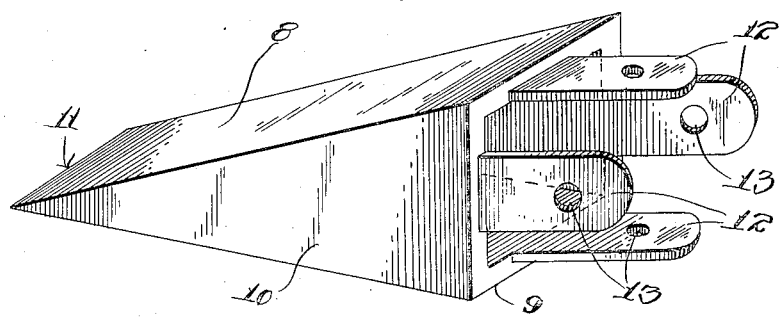
WITNESSES  
Howard F. Costello  
H. B. Vrooman
INVENTOR  
John W. Harrell  
By E. E. Vrooman his Attorney

UNITED STATES PATENT OFFICE.

JOHN WILLIAM HARRELL, OF BIRMINGHAM, ALABAMA.

DIPPER-TOOTH.

1,126,759.      Specification of Letters Patent.      Patented Feb. 2, 1915.

Application filed March 1, 1913, Serial No. 751,551. Renewed June 18, 1914. Serial No. 845,974.

*To all whom it may concern:*

Be it known that I, JOHN WILLIAM HARRELL, a citizen of the United States, residing at Birmingham, in the county of Jefferson and State of Alabama, have invented certain new and useful Improvements in Dipper-Teeth, of which the following is a specification, reference being had therein to the accompanying drawing.

This invention relates to a detachable point for a dipper tooth which is adapted to be used in combination with steam shovels and devices of similar character.

Another object of this invention is the production of a tooth which is provided with a detachable point which may be used for digging into the earth or which may be turned so as to cut vertically into stiff earth or rock when it is so desired, and which is provided with a simple and efficient means for holding the point upon the tooth.

With these and other objects in view, this invention consists of certain novel combinations, constructions and arrangement of parts as will be hereinafter fully described and claimed.

In the accompanying drawing: Figure 1 is a perspective view of the tooth and detachable point. Fig. 2 is a longitudinal sectional view of the dipper tooth and point. Fig. 3 is a perspective view of the point.

Referring to the accompanying drawing by numerals it will be seen that the device consists of the tapering shank 1 having a lip 2 in which there is formed a plurality of apertures 3. The shank 1 is also provided with a plurality of apertures 4 which register with the apertures 3 and also a plurality of apertures 4'. By spacing the lip 2 from the shank 1 there is provided a slot in which the edge of the shovel may be placed, the shank 1 being fastened upon the shovel by any suitable means passing through the apertures 4' and 4. The forward end of the shank 1 is provided with a squared stub point 5 having a flat front end 6. Adpacent the stub point 5 there is provided a plurality of pockets 7.

The detachable point which is used in combination with the tooth comprises converging upper and lower portions 8 and 9 respectively. The sides 10 extend parallel to each other through their entire length, and since the portions 8 and 9 converge toward the outer edge there will be presented an elongated cutting edge 11. Integrally formed upon the inner end of this tooth there is provided a plurality of lugs 12 which are positioned out of alinement with the outer surface of the top, bottom and sides. These lugs 12 are also provided with a plurality of apertures 13 which register with the threaded sockets 14 formed on the stub tooth 5.

When this device is used the shovel will fit between the lip and shank and a securing means will pass through the apertures formed in the shank and lip. The detachable tooth may then be placed upon the stub tooth at which time the lugs 12 will rest within the pockets 7. Securing screws 15 may then be passed through the apertures 13 and into the sockets 14 for holding the detachable tooth upon the stub tooth. Since the lugs are positioned out of alinement with the outer surface of the point, the heads of the screws 15 will be positioned within the pockets 7 so as to allow a substantially even surface upon the upper face of the tooth, whereby it will easily pass into the earth which is being shoveled. It will also be seen that by use of the squared stub tooth 5 the detachable tooth will be prevented from producing any strain upon the screws 15 by twisting the same.

When it is desired to cut into rock, stiff clay, or dirt, it would be very difficult to do so when the edge of the detachable point extends in a horizontal plane, therefore this detachable point may be moved from the member 5 and turned so as to allow the edge 11 to extend vertically so as to give a vertical cut when so desired, and by forming lugs upon the top, bottom and sides, the detachable point will be so formed as to allow the lugs to register with any of the pockets formed upon the shank whereby the detachable tooth will be held firmly in place regardless of the manner in which it is positioned upon the stub tooth or point.

Having thus described the invention, what is claimed as new, is:

A dipper tooth for a steam shovel or the like, comprising an elongated shank, a squared stub point formed upon the forward end of said shank, a plurality of pockets formed upon the forward end of said shank adjacent said stub point, a pocket being formed upon each side of said shank, a detachable point positioned upon said stub point, said detachable point provided with a converging top and bottom, the sides thereof extending parallel to each other, a plurality of lugs formed upon said detachable point at the inner end thereof and positioned out of alinement with the outer faces of said point, said point capable of being positioned upon said stub point and adapted to be turned to different positions upon said stub point, whereby the forward edge of said tooth will be turned so as to cause a vertical or horizontal cut, as desired, said lugs adapted to fit in said pockets regardless of the manner in which the adjustable tooth is positioned.

In testimony whereof I hereunto affix my signature in presence of two witnesses.

JOHN WILLIAM HARRELL.

Witnesses:
EMMITT EDWARD BISHOP,
THOS. ROWEON.